(12) United States Patent
Lin

(10) Patent No.: US 8,537,292 B2
(45) Date of Patent: Sep. 17, 2013

(54) MULTI-FUNCTIONAL LIQUID CRYSTAL PARALLAX BARRIER DEVICE COMPRISING A DOUBLE-VIEW VERTICAL STRIP PARALLAX BARRIER AND A MULTI-VIEW SLANT-AND-STEP PARALLAX BARRIER

(75) Inventor: Ming-Yen Lin, Taipei (TW)

(73) Assignee: Unique Instruments Co. Ltd, Taipei (TW)

(*) Notice: Subject to any disclaimer, the term of this patent is extended or adjusted under 35 U.S.C. 154(b) by 264 days.

(21) Appl. No.: 13/045,892

(22) Filed: Mar. 11, 2011

(65) Prior Publication Data

US 2011/0222017 A1 Sep. 15, 2011

(30) Foreign Application Priority Data

Mar. 12, 2010 (TW) .............................. 099107311 A

(51) Int. Cl.
*G02F 1/1335* (2006.01)
*G09G 5/00* (2006.01)
*G02B 27/22* (2006.01)
*H04N 13/04* (2006.01)

(52) U.S. Cl.
USPC ................. 349/15; 345/6; 359/462; 348/51

(58) Field of Classification Search
USPC .................. 349/15; 345/4–9; 359/462–477; 348/51
See application file for complete search history.

(56) References Cited

U.S. PATENT DOCUMENTS

| 2007/0058127 A1* | 3/2007 | Mather et al. ................. 349/159 |
| 2008/0055500 A1* | 3/2008 | Maeda ............................. 349/15 |

* cited by examiner

*Primary Examiner* — Paul Lee
(74) *Attorney, Agent, or Firm* — WPAT, PC; Justin King

(57) ABSTRACT

A multi-functional liquid crystal parallax barrier device is a liquid crystal device mainly formed by two parallax barrier structures, namely, a double-view vertical strip parallax barrier and a multi-view slant-and-step parallax barrier, in which the two parallax barriers are disposed in the same horizontal display direction, so as to display a double-view 3D image and a multi-view 3D image, in addition to displaying a 2D image, through the control of an appropriate driving voltage and the use of a flat panel display screen.

6 Claims, 17 Drawing Sheets

Reduced amount of the horizontal opening width of the light-transmissive element

MULTI-FUNCTIONAL LIQUID CRYSTAL PARALLAX BARRIER DEVICE COMPRISING A DOUBLE-VIEW VERTICAL STRIP PARALLAX BARRIER AND A MULTI-VIEW SLANT-AND-STEP PARALLAX BARRIER

BACKGROUND OF THE INVENTION

1. Field of Invention

The present invention relates to a multi-functional liquid crystal parallax barrier device, which is a liquid crystal device mainly formed by two parallax barrier structures, namely, a double-view vertical strip parallax barrier and a multi-view slant-and-step parallax barrier, in which the two parallax barriers are disposed in the same horizontal display direction, so as to display a double-view 3D image and a multi-view 3D image, in addition to displaying a 2D image, through the control of an appropriate driving voltage and the use of a flat panel display screen.

2. Related Art

According to a multi-functional liquid crystal parallax barrier device stated in ROC Patent Application No. 099100423, the device is a liquid crystal parallax barrier device formed by two independent barrier electrodes, in which a voltage is respectively applied to drive the two independent barrier electrodes, so as to achieve the purpose of displaying 3D images bi-directionally or with different barrier configuration structures or with different numbers of views. FIG. 1 and FIG. 2 show basic structure of a multi-functional liquid crystal parallax barrier device.

FIG. 1 is a schematic view of the structure of the multi-functional liquid crystal parallax barrier device according to a first embodiment of the patent. The multi-functional liquid crystal parallax barrier device 100 is mainly formed by an upper linear polarizer 101, an upper transparent substrate 102, a common electrode layer 103, an upper alignment layer 104, a liquid crystal molecular layer 105, a lower alignment layer 106, a pair of barrier electrode layers 107, a lower transparent substrate 111, and a lower linear polarizer 112. The pair of barrier electrode layers 107 is formed by an upper barrier electrode layer 108, an insulation layer 109, and a lower barrier electrode layer 110. The insulation layer 109 electrically isolates the two barrier electrode layers 108 and 110 to avoid an electrical short circuit between the two barrier electrode layers. The upper linear polarizer 101, the common electrode layer 103, and the upper alignment layer 104 are disposed on the upper transparent substrate 102. The lower alignment layer 106, the upper barrier electrode layer 108, the insulation layer 109, the lower barrier electrode layer 110, and the lower linear polarizer 112 are disposed on the lower transparent substrate 111.

FIG. 2 is a schematic view of the structure of the multi-functional liquid crystal parallax barrier device according to a second embodiment of the patent. The multi-functional liquid crystal parallax barrier device 200 is mainly formed by an upper linear polarizer 201, an upper transparent substrate 202, an upper common electrode layer 203, an upper insulation layer 204, an upper barrier electrode layer 205, an upper alignment layer 206, a liquid crystal molecular layer 207, a lower alignment layer 208, a lower barrier electrode layer 209, a lower insulation layer 210, a lower common electrode layer 211, a lower transparent substrate 212, and a lower linear polarizer 213. The upper linear polarizer 201, the upper common electrode layer 203, the upper insulation layer 204, the upper barrier electrode layer 205, and the upper alignment layer 206 are disposed on the upper transparent substrate 202. The lower alignment layer 208, the lower barrier electrode layer 209, the lower insulation layer 210, the lower common electrode layer 211, and the lower linear polarizer 213 are disposed on the lower transparent substrate 212.

Although the patent of the multi-functional liquid crystal parallax barrier device discloses the structures of the two embodiments and provides the method of disposing barriers having different features on the two barrier electrode layers 108, 110 and 205, 209 respectively to achieve the purpose of displaying the 3D images bi-directionally or with different barrier configuration structures or with different numbers of views. However, the multi-functional liquid crystal parallax barrier device of this patent fails to give any specific or in-depth discussion on how to provide an optimized parallax barrier for 3D applications including 3D static photos, 3D movies, 3D animations, and 3D games having different viewing conditions.

SUMMARY OF THE INVENTION

A multi-functional liquid crystal parallax barrier device of the present invention is an application of a multi-functional liquid crystal parallax barrier device stated in ROC Patent Application No. 099100423, in which two different parallax barrier structures, namely, a double-view vertical strip parallax barrier and a multi-view slant-and-step parallax barrier are respectively disposed on different barrier electrodes of the multi-functional liquid crystal parallax barrier device and the two parallax barriers are disposed in the same horizontal display direction. For 3D still photos and 3D movies having a double-view effect commonly popular on the market, the double-view vertical strip parallax barrier may be used to achieve the purpose of displaying the 3D images. In addition, for 3D animations and 3D games having a multi-view effect, the multi-view slant-and-step parallax barrier may be used to achieve the purpose of displaying the 3D images. Furthermore, through the drive of a proper external voltage, one parallax barrier is selectively actuated to achieve the purpose of displaying the 3D images for the above different 3D applications respectively. Hereinafter, how to optimize the above two parallax barrier structures for the two different 3D applications is described to achieve the effect of displaying a desired 3D image.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
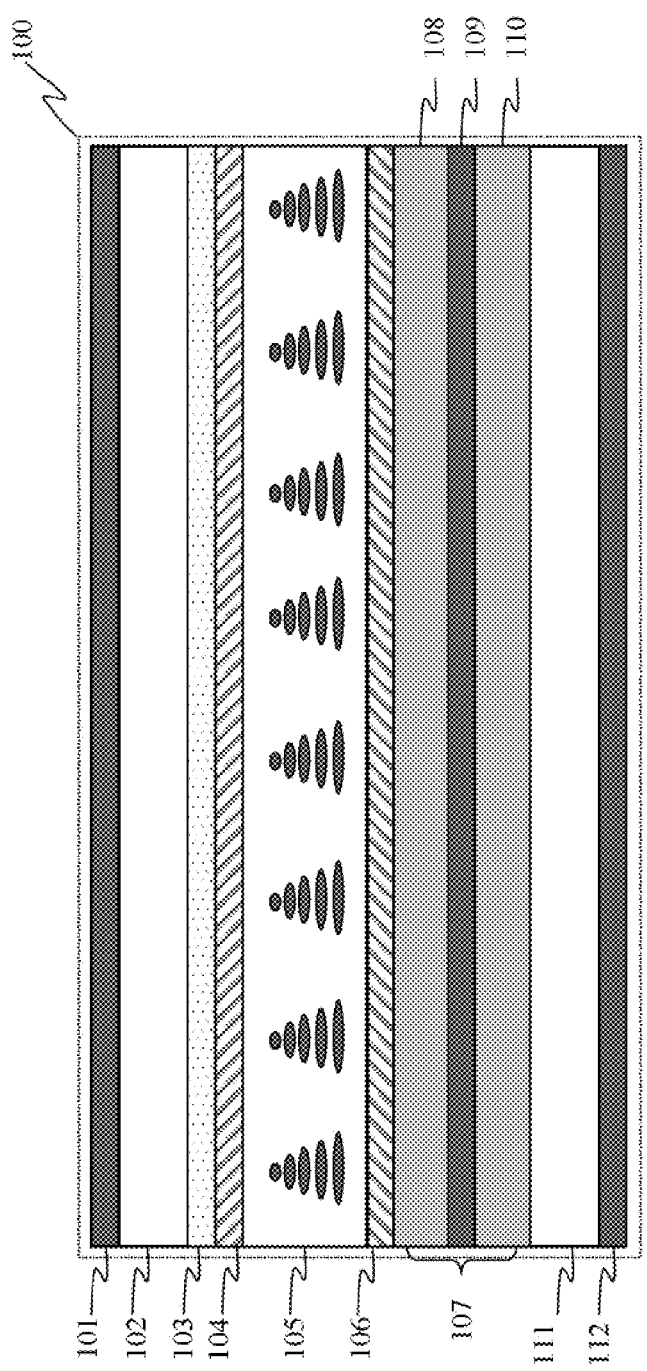
FIG. 1 is a schematic view of structure of a multi-functional liquid crystal parallax barrier device.
Figure 2:
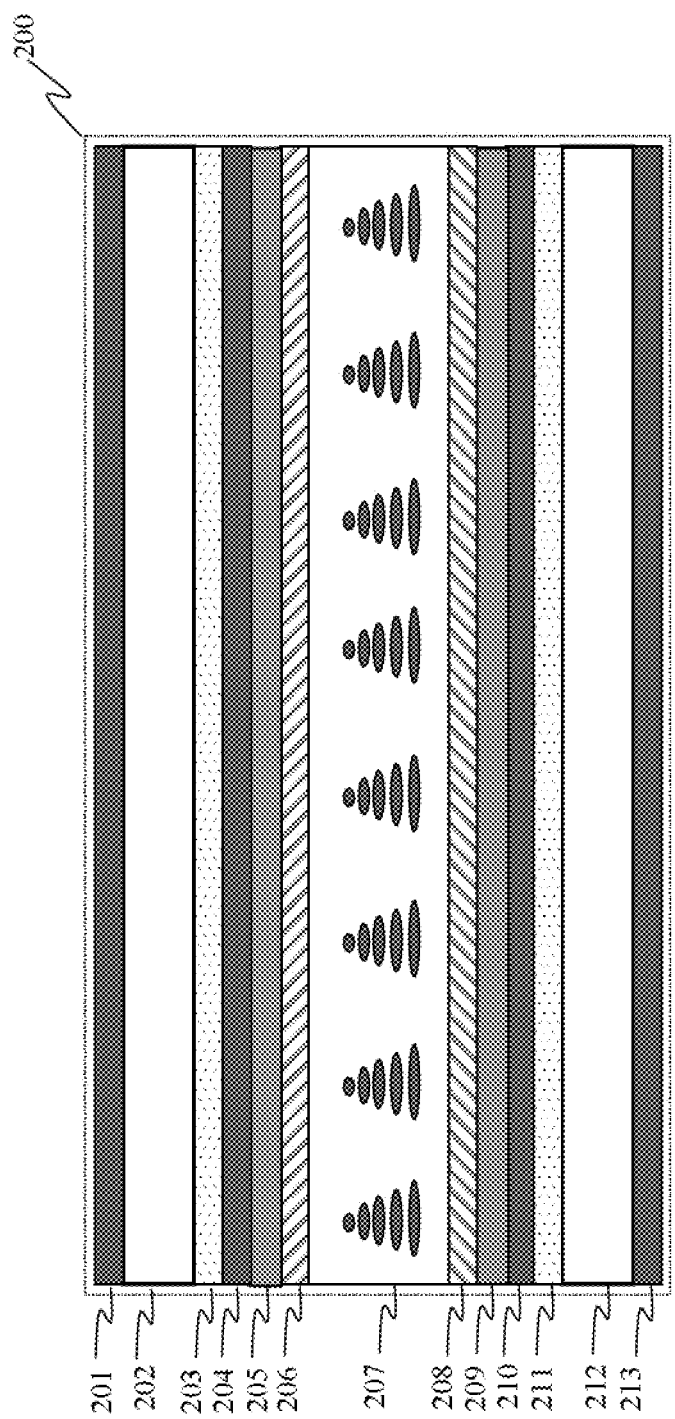
FIG. 2 is a schematic view of structure of another multi-functional liquid crystal parallax barrier device.
Figure 3:
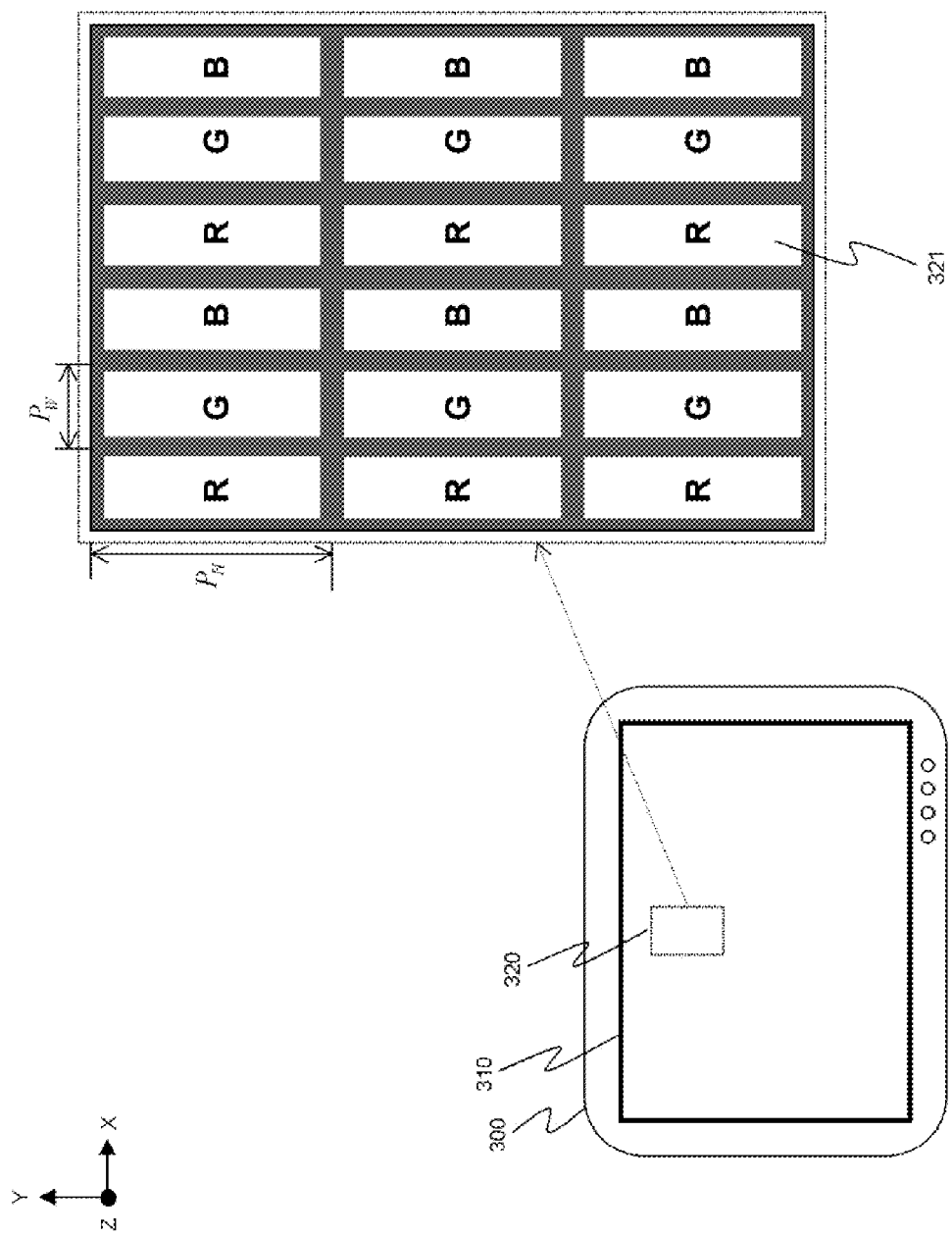
FIG. 3 is a schematic view of structure of a conventional flat panel display screen.

Firstly, parameters of the display screen and display directions of the 3D image are defined. As shown in FIG. 3, a screen 310 of a conventional flat panel display 300 is formed by a plurality of RGB sub-pixel units 320. A single RGB sub-pixel unit 321 has a size of $P_W \times P_H$, where $P_W$ is a horizontal width of the sub-pixel and $P_H$ is a vertical width of the sub-pixel. The RGB sub-pixels may be configured in a horizontal direction (i.e., an X-axis direction) or configured in a vertical direction (i.e., a Y-axis direction). In the present invention, the RGB sub-pixels are configured in the horizontal direction as an example to illustrate the efficacy of the present invention. In addition, no matter the RGB sub-pixels are configured in the horizontal direction or in the vertical direction, for the double-view or multi-view 3D image displayed by the screen 310 of the flat panel display 300, the above two parallax barriers both have the same horizontal display direction. That is to say, at an optimal viewing point on an optimal viewing distance along the horizontal direction, the two parallax barriers may respectively separate the double-view and the multi-view 3D image into a single-view image. Reference can be made to ROC Patent Applications No. 097135421, No. 098113625, and No. 098128986 for the above view separation function.

Regarding the optimization of the double-view vertical strip parallax barrier and the multi-view slant-and-step parallax barrier, the optimization of the structure in the horizontal direction is discussed first, and then the optimization of the structure in the vertical direction is illustrated.

Figure 4:
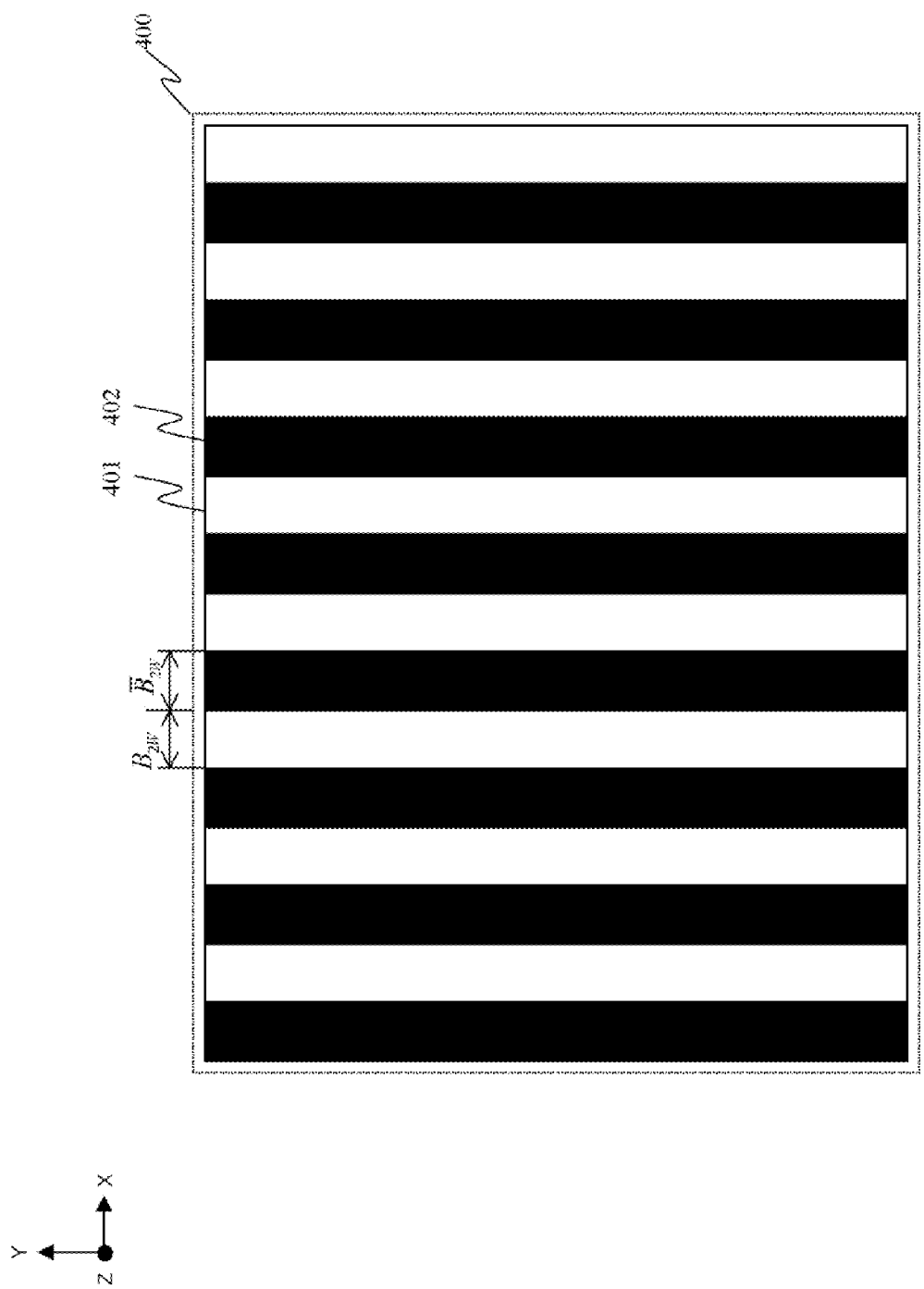
FIG. 4 is a schematic view of a double-view vertical strip parallax barrier structure.

FIG. 4 is a schematic view of a double-view vertical strip parallax barrier structure in the present invention. The double-view vertical strip parallax barrier 400 is mainly formed by a plurality of light-transmissive elements 401 and shielding elements 402. The light-transmissive element 401 and the shielding element 402 have a geometrical vertical strip structure and respectively have a horizontal width $B_{2W}$, $\overline{B}_{2W}$.

Figure 5:
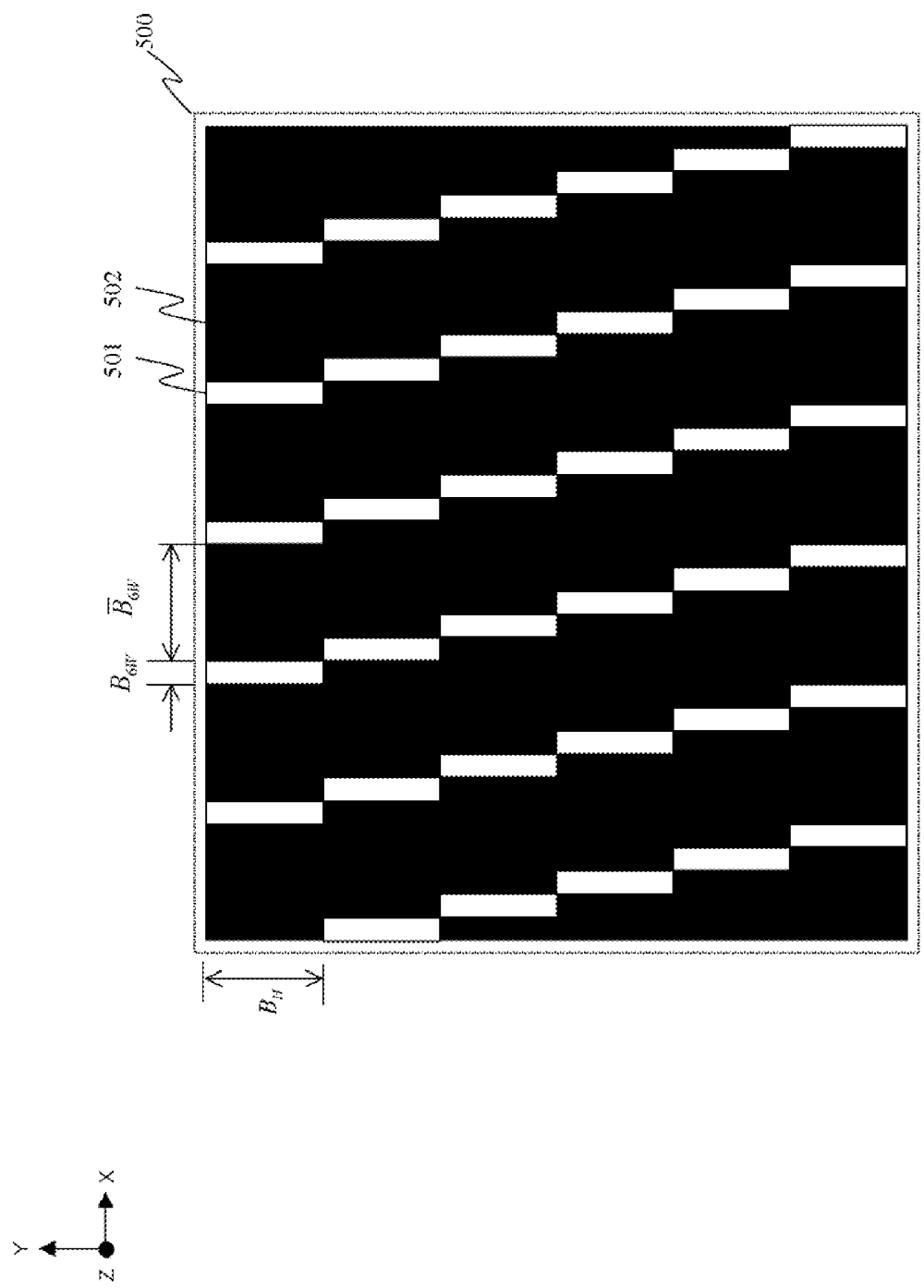
FIG. 5 is a schematic view of a multi-view slant-and-step parallax barrier structure.

FIG. 5 is a schematic view of a multi-view slant-and-step parallax barrier structure of the present invention. Here, the multi-view refers to the number of views is greater than or equal to two, and for ease of description, the number of views is set to 6 as an example for illustrating the efficacy of the present invention. The multi-view slant-and-step parallax barrier 500 is mainly formed by a plurality of light-transmissive elements 501 and shielding elements 502. The light-transmissive element 501 and the shielding element 502 have a geometrical step structure and respectively have a horizontal width $B_{6W}$, $\overline{B}_{6W}$. According to ROC Patent Application No. 098128986, the light-transmissive elements 401, 501 and the shielding elements 402, 502 have the following basic relations:

$$B_{nW} = \frac{P_{nW} L_E}{P_{nW} + L_E} \quad (1)$$

$$\overline{B}_{nW} = (n-1) B_{nW} \quad (2)$$

$$Z_{n0} = \frac{P_{nW}}{P_{nW} - B_{nW}} L_B \quad (3)$$

where n is a number of views and $n \geq 2$. Here, the 3D image displayed by the double-view vertical strip parallax barrier 400 is the double-view combined image formed with the number of views n=2; while the 3D image displayed by the multi-view slant-and-step parallax barrier 500 is the multi-view combined image formed with the number of views n>2 (as described above, set n=6). $P_{nW}$ is a horizontal width of a smallest view image display unit displayed on the screen (that is, the horizontal width of the view image corresponding to the single step light-transmissive element 501, and for example, the $P_{nW}$ may be a horizontal width of a single RGB sub-pixel or a plurality of RGB sub-pixels, or even a non-integer number of RGB sub-pixels), $L_E$ is an average inter-pupillary distance (IPD), $Z_{n0}$ is an optimal viewing distance, and $L_B$ is an installation distance of the parallax barrier.

As described above, when the double-view vertical strip parallax barrier 400 and the multi-view slant-and-step parallax barrier 500 are integrated in the same multi-functional liquid crystal parallax barrier device 100, 200, the two parallax barrier structures must be optimized according to the following design, so as to achieve the effect of displaying the desired 3D image.

1. Optimization of Viewing Distance

The optimization of the viewing distance means that the use of any double-view vertical strip parallax barrier 400 and multi-view slant-and-step parallax barrier 500 must meet the condition that both of the two parallax barriers have the same optimal viewing distance, i.e., $Z_{20} = Z_{60} = Z_0$ for the convenience of use. According to Formulas (1) and (3), regarding the same installation distance of the parallax barrier $L_B$ and the same average IPD $L_E$, set $P_{2W} = P_{6W}$ and $B_{2W} = B_{6W}$ to obtain $Z_{20} = Z_{60} = Z_0$. That is, regarding the double-view vertical strip parallax barrier 400 and the multi-view slant-and-step parallax barrier 500, both $P_{nW}$ and $B_{nW}$ of the light-transmissive element of those two parallax barrier must be consistent. To uniformly distribute the multi-view image with a number of views greater than 2, preferably, the horizontal width of the smallest view image display unit is set to $P_{2W} = P_{6W} = P_W$, that is, the horizontal width $P_W$ of a single RGB sub-pixel unit is the horizontal width of the smallest view image display unit. In addition, set $B_W=B_{2W}=B_{6W}$, thus Formulas (1) to (3) are turned into:

$$B_{nW} = B_W = \frac{P_W L_E}{P_W + L_E} \tag{4}$$

$$\overline{B}_{nW} = (n-1)B_W \tag{5}$$

$$Z_{n0} = Z_0 = \frac{P_W}{P_W - B_W} L_B \tag{6}$$

2. Optimization of Horizontal Opening Width of Light-Transmissive Element

Figure 6:
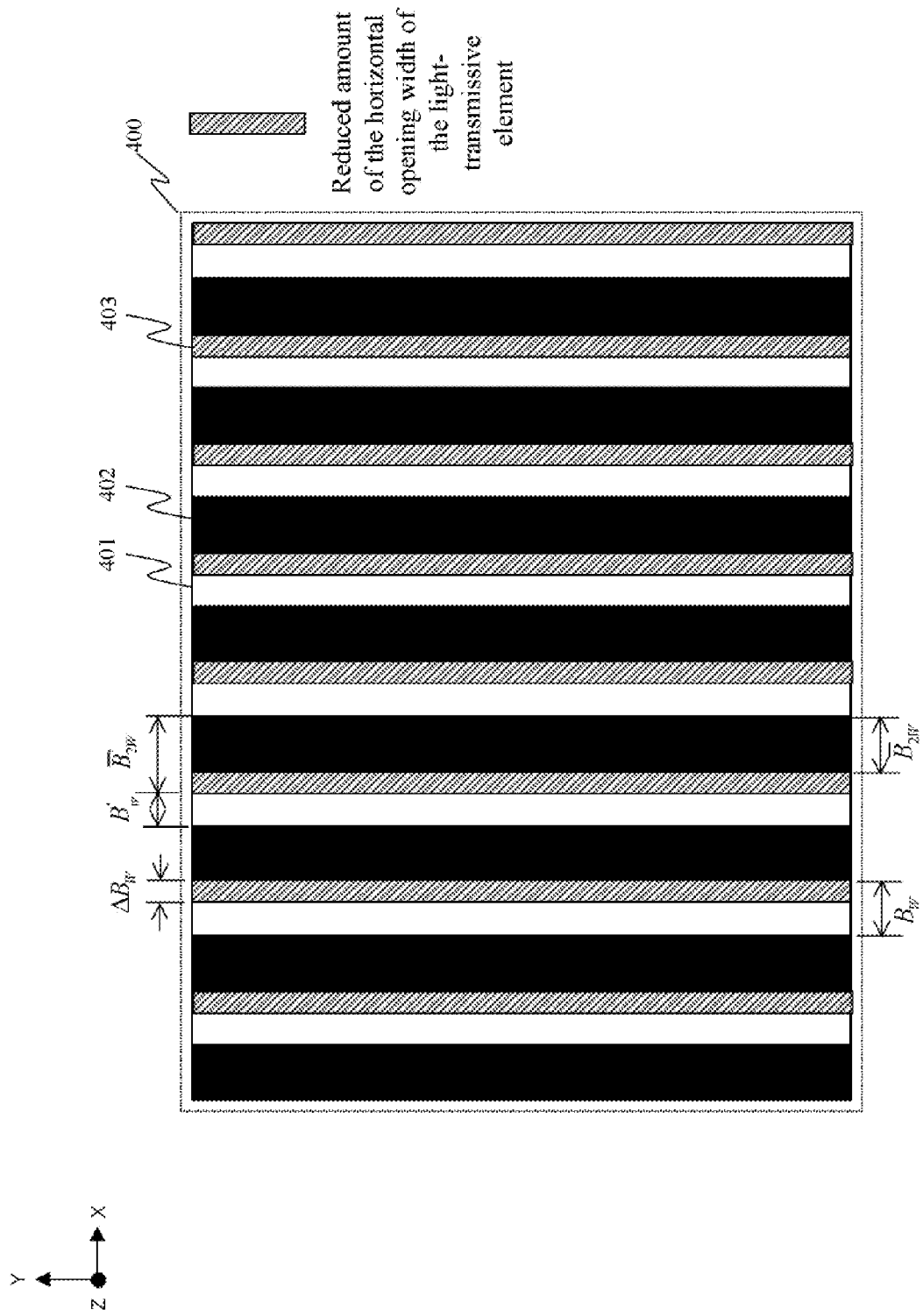
FIG. 6 is a schematic view of the double-view vertical strip parallax barrier structure after a horizontal opening width of the light-transmissive element is optimized.
Figure 7:
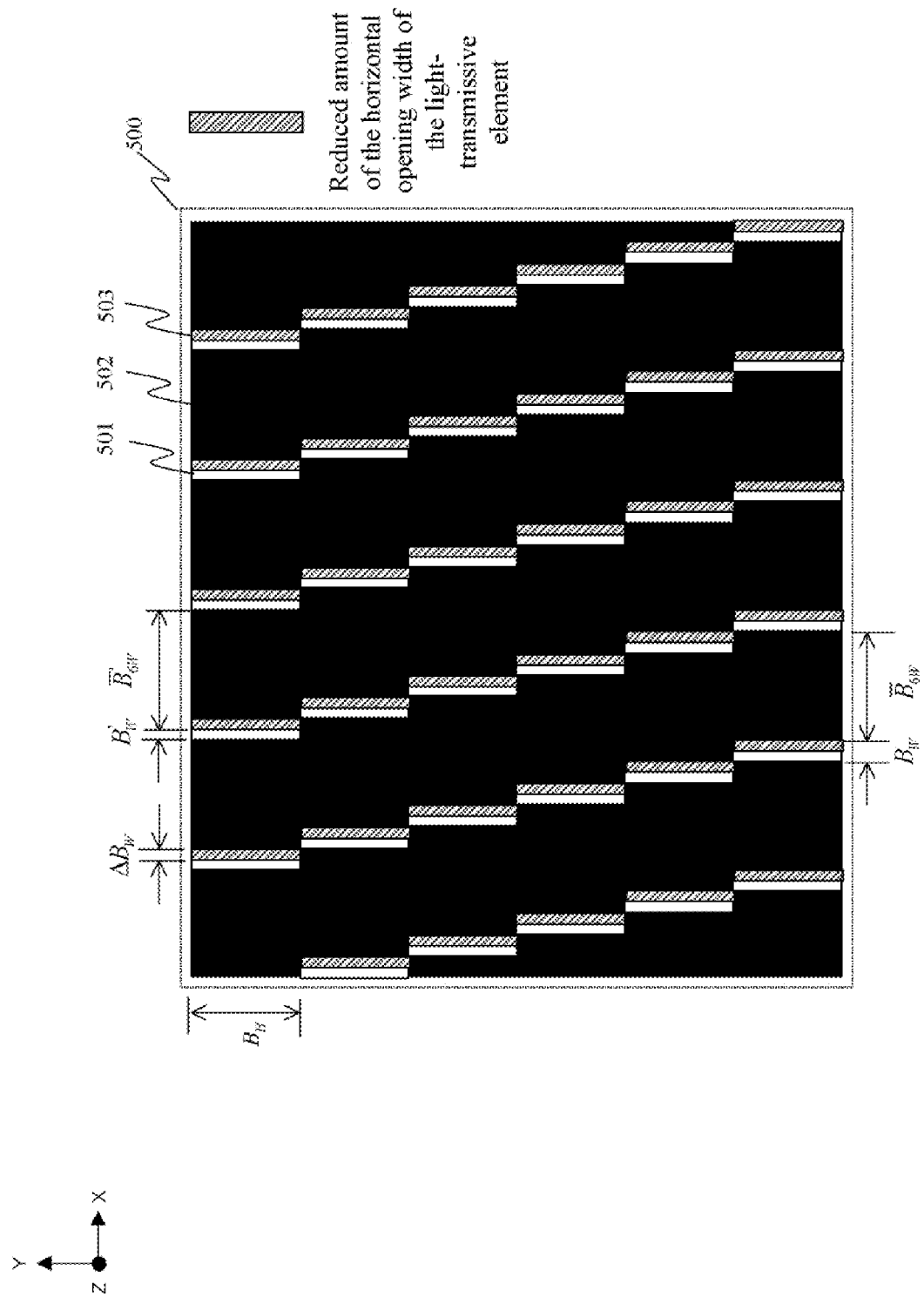
FIG. 7 is a schematic view of the multi-view slant-and-step parallax barrier structure after the horizontal opening width of the light-transmissive element is optimized.

According to ROC Patent Application No. 098128986, regarding the double-view vertical strip parallax barrier 400 and the multi-view slant-and-step parallax barrier 500 in FIG. 6 and FIG. 7, a proper reduction 403, 503 must be made to the horizontal opening width $B_W$ of the light-transmissive element of the two parallax barriers to achieve the effect of increasing a horizontal viewing range. Here, the horizontal viewing range refers to an allowed maximum horizontal viewing range for viewing 3D images on the optimal viewing distance without generating any ghost image in the horizontal direction. Therefore, the horizontal opening width of the light-transmissive element and the horizontal shielding width of the shielding element may be optimized according to the following formulas:

$$B'_W = B_W - \Delta B_W \tag{7}$$

$$\overline{B}'_{nW} = \overline{B}_{nW} + \Delta B_W \tag{8}$$

where $B'_W$ is an optimized opening width of the light-transmissive element, $\overline{B}'_{nW}$ is an optimized shielding width of the shielding element, and $\Delta B_W$ is a reducing amount of the opening width of the light-transmissive element. The relation of $\Delta B_W$ and the horizontal viewing range are illustrated below.

Figure 8:
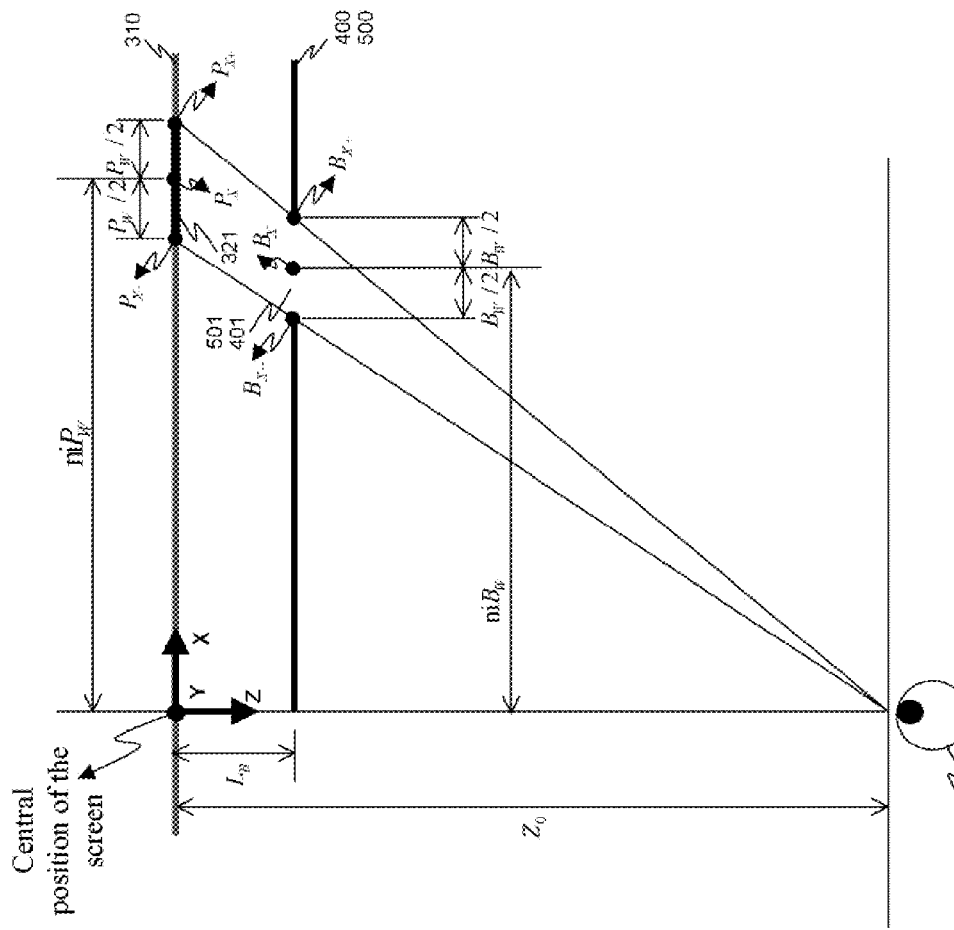
FIG. 8 is a schematic view of definitions of all relevant structures and parameters before the horizontal opening width of the light-transmissive element is optimized.

FIG. 8 is a schematic view of definitions of all relevant structures and parameters before the horizontal opening width of the light-transmissive element is optimized. Firstly, an origin of a coordinate system XYZ is set at a central position of the screen 310 and the parallax barriers 400, 500 are disposed at $L_B$ of the Z-axis. In the horizontal direction (X-axis), the central position of any sub-pixel 321 is set to be $P_X$. Corresponding to the sub-pixel 321, there exists a light-transmissive element 401, 501 which allows eyes 530 of a viewer to view the whole image of the sub-pixel 321 at the optimal viewing distance $Z_0$ through the horizontal opening of the light-transmissive element 401, 501. The central position of the light-transmissive element 401, 501 is set to be $B_X$. Thus, $P_X$, $B_X$ respectively have the following relations:

$$P_X = niP_W \tag{9}$$

$$B_X = niB_W \tag{10}$$

where n is a number of views and i is a positive integer. In addition, the positions of the left and right ends of the sub-pixel 321 are respectively set to be $P_{X-}$, $P_{X+}$; and the positions of the left and right ends of the light-transmissive elements 401, 501 are set to be $B_{X-}$, $B_{X+}$. Therefore, $P_{X-}$, $P_{X+}$, $B_{X-}$, $B_{X+}$ respectively have the following relations:

$$P_{X-} = \left(ni - \frac{1}{2}\right)P_W \tag{11}$$

$$P_{X+} = \left(ni + \frac{1}{2}\right)P_W \tag{12}$$

$$B_{X-} = \left(ni - \frac{1}{2}\right)B_W \tag{13}$$

$$B_{X+} = \left(ni + \frac{1}{2}\right)B_W \tag{14}$$

Figure 9:
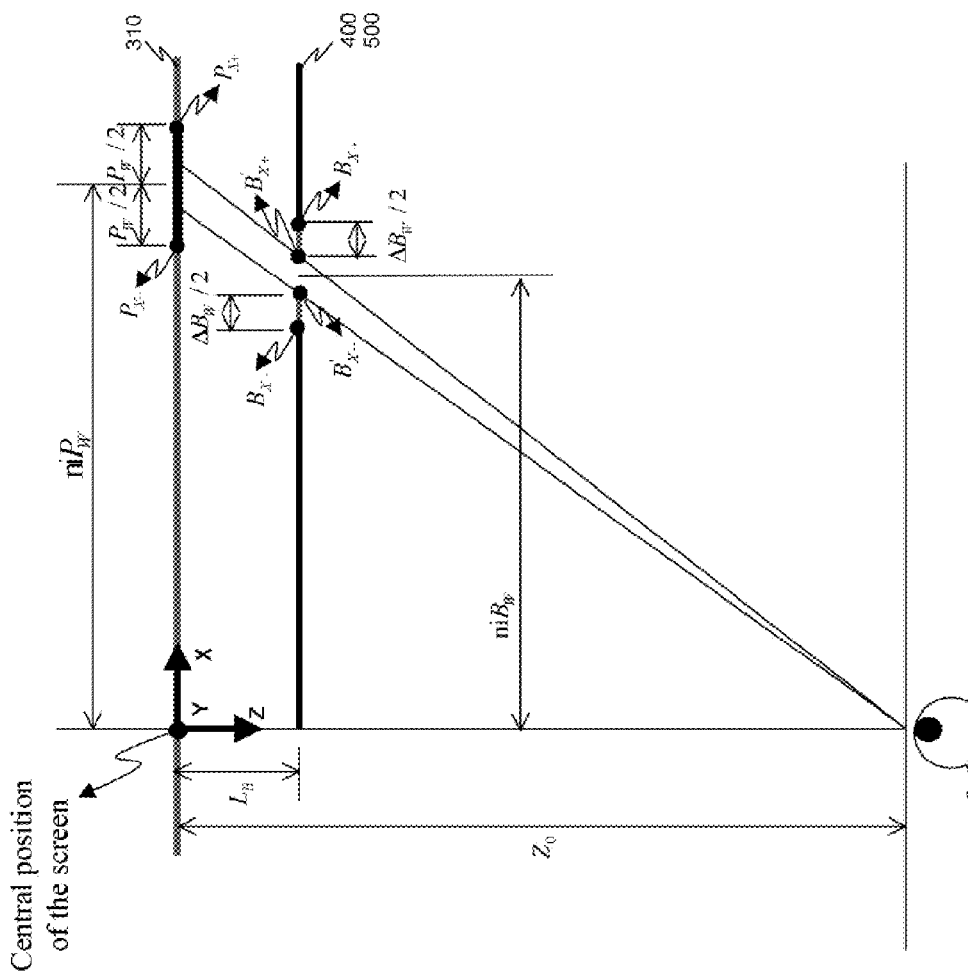
FIG. 9 is a schematic view of definitions of all relevant structures and parameters after the horizontal opening width of the light-transmissive element is optimized.

FIG. 9 is a schematic view of definitions of all relevant structures and parameters after the horizontal opening width of the light-transmissive element is optimized. Here, according to the optimization of the horizontal opening width, the openings at the left and right ends of the light-transmissive elements 401, 501 are respectively reduced by a proper amount $\Delta B_W/2$, so that after the optimization, the positions of the left and right ends of the light-transmissive elements 401, 501 respectively become $B'_{X-}$, $B'_{X+}$ and have the following relations:

$$B'_{X-} = \left(ni - \frac{1}{2}\right)B_W + \frac{1}{2}\Delta B_W \tag{15}$$

$$B'_{X+} = \left(ni + \frac{1}{2}\right)B_W - \frac{1}{2}\Delta B_W \tag{16}$$

Therefore, the eyes 530 of the viewer may view a part of the image of the sub-pixel 321 through the light-transmissive elements 401, 501.

Figure 10:
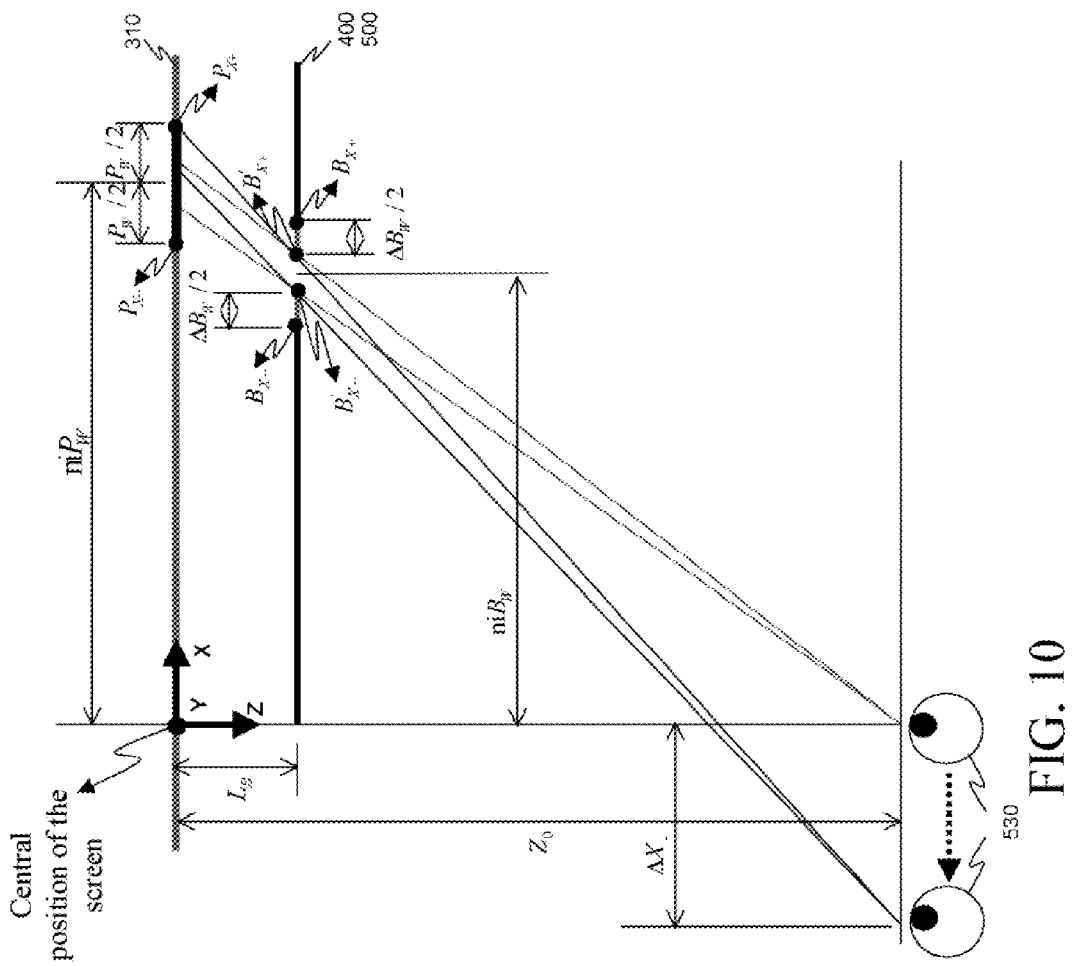
FIG. 10 is a schematic view of a left horizontal viewing range after the horizontal opening width of the light-transmissive element is optimized.

FIG. 10 is a schematic view of a left horizontal viewing range after the horizontal opening width of the light-transmissive element is optimized. Here, the left horizontal viewing range $\Delta X_-$ refers to an allowed maximum leftward displacement of the viewer under the condition that the eyes 530 of the viewer can still view the image without any horizontal ghost image when moving leftwards from the central position. The relation of the left horizontal viewing range $\Delta X_-$ and the reducing amount $\Delta B_W/2$ is expressed by the following formula:

$$\Delta X_- = \frac{Z_0}{L_B} \frac{\Delta B_W}{2} \tag{17}$$

Figure 11:
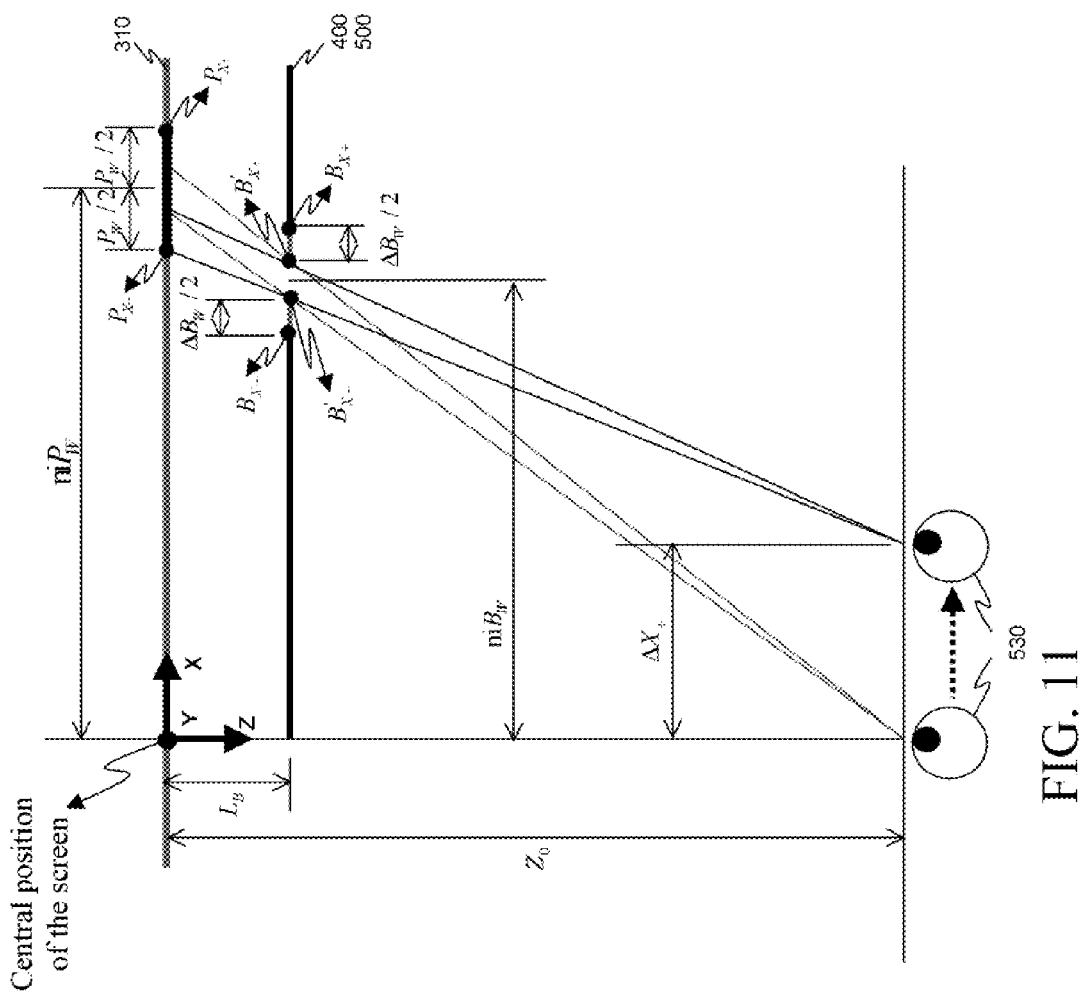
FIG. 11 is a schematic view of a right horizontal viewing range after the horizontal opening width of the light-transmissive element is optimized.

FIG. 11 is a schematic view of a right horizontal viewing range after the horizontal opening width of the light-transmissive element is optimized. The right horizontal viewing range $\Delta X_+$ refers to an allowed maximum rightward displacement of the viewer under the condition that the eyes 530 of the viewer can still view the image without any horizontal ghost image when moving rightwards from the central position. The relation of the right horizontal viewing range $\Delta X_+$ and the reducing amount $\Delta B_W/2$ is expressed by the following formula:

$$\Delta X_+ = \frac{Z_0}{L_B} \frac{\Delta B_W}{2} \tag{18}$$

Therefore, according to Formulas (17) and (18), a horizontal viewing range $\Delta X$ is defined to be a sum of Formulas (17) and (18), and is expressed by the following formula:

$$\Delta X = \frac{Z_0}{L_B} \Delta B_W \tag{19}$$

According to Formula (19), the horizontal opening width of the light-transmissive element is reduced, that is, a greater value of $\Delta B_W$ is set to obtain a larger horizontal viewing range. However, the setting of the greater value of $\Delta B_W$ may cause a decrease of the image brightness. Therefore, reference can be made to ROC Patent Application No. 098128986 for the design of how to set the value of $\Delta B_W$ to obtain a desired horizontal opening width of the light-transmissive element.

3. Vertical Opening Width of Light-Transmissive Element

Firstly, the calculation of the vertical opening width of the light-transmissive element is illustrated. Since the vertical strip parallax barrier does not have any structural characteristic in the vertical direction, no problem will occur in the vertical direction. Thus, only the multi-view slant-and-step parallax barrier 500 is discussed and illustrated below. As described above, the smallest view image display unit refers to a size of the view image corresponding to any light-transmissive element. For the slant-and-step parallax barrier 500 having the step light-transmissive elements, in the vertical direction, the vertical width of the smallest view image display unit may be a vertical width of a single RGB sub-pixel or a plurality of RGB sub-pixels, or even a non-integer number of RGB sub-pixels. To uniformly distribute the multi-view image having a number of views greater than 2, preferably, a vertical width $P_H$ of a single RGB sub-pixel unit is set to be the vertical width of the smallest view image display unit. Thus, the vertical opening width of the light-transmissive element is calculated according to the vertical width $P_H$ of a single RGB sub-pixel unit hereinafter.

Figure 12:
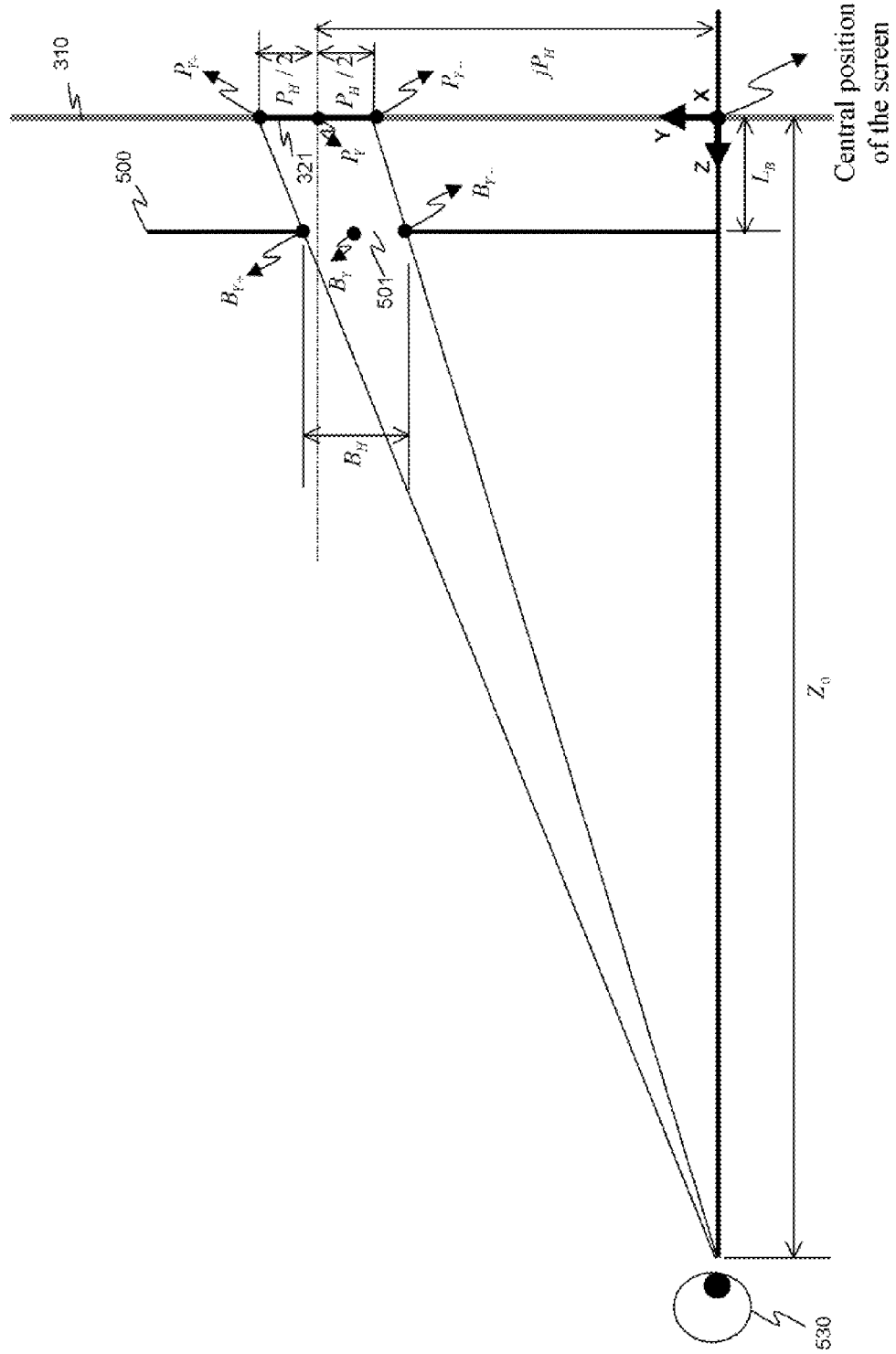
FIG. 12 is a schematic view of definitions of all relevant structures and parameters before the vertical opening width of the light-transmissive element is optimized.

FIG. 12 is a schematic view of definitions of all relevant structures and parameters before the vertical opening width of the light-transmissive element is optimized. In the vertical direction (Y-axis), the central position of any sub-pixel 321 disposed relative to the central position of the screen is set to be $P_Y$. Corresponding to the sub-pixel 321, there exists a light-transmissive element 501 which allows the eyes 530 of the viewer to view the whole image of the sub-pixel 321 at the optimal viewing distance $Z_0$ through the vertical opening of the light-transmissive element 501. The central position of the light-transmissive element 501 is set to be $B_Y$. Thus, $P_Y$, $B_Y$ respectively have the following relations:

$$P_Y = jP_H \quad (20)$$

$$B_Y = jB_H \quad (21)$$

where $P_H$ is a vertical width of the sub-pixel, $B_H$ is a vertical opening width of the light-transmissive element, j is a positive integer, and $B_H$ and $P_H$ have the following relation:

$$B_H = \frac{Z_0 - L_B}{Z_0} P_H \quad (22)$$

Further, substitute Formula (6) into Formula (22), and the relation of $P_H$ and $B_H$ may be expressed by the following formula:

$$B_H = \frac{B_W}{P_W} P_H \quad (23)$$

In addition, the positions of the upper and lower ends of the sub-pixel 321 are respectively set to be $P_{Y+}$, $P_{Y-}$; and the positions of the upper and lower ends of the light-transmissive element 501 are respectively set to be $B_{Y+}$, $B_{Y-}$. Thus, $P_{Y+}$, $P_{Y-}$, $B_{Y+}$, $B_{Y-}$ respectively have the following relations:

$$P_{Y+} = \left(j + \frac{1}{2}\right) P_H \quad (24)$$

$$P_{Y-} = \left(j - \frac{1}{2}\right) P_H \quad (25)$$

$$B_{Y+} = \left(j + \frac{1}{2}\right) B_H \quad (26)$$

$$B_{Y-} = \left(j - \frac{1}{2}\right) B_H \quad (27)$$

Substitute Formula (22) into Formulas (26) and (27) to obtain:

$$B_{Y+} = \frac{Z_0 - L_B}{Z_0} (j + 1/2) P_H \quad (28)$$

$$B_{Y-} = \frac{Z_0 - L_B}{Z_0} (j - 1/2) P_H \quad (29)$$

4. Optimization of Vertical Opening Width of Light-Transmissive Element

Hereinafter, the optimization of the vertical opening width of the light-transmissive element is illustrated. Since the vertical strip parallax barrier does not have any structural characteristic in the vertical direction, no ghost image will be generated in the vertical direction. Therefore, only the multi-view slant-and-step parallax barrier 500 is discussed and illustrated below.

As shown in FIG. 5 and FIG. 7, regarding any light-transmissive element in the multi-view slant-and-step parallax barrier 500, since the light-transmissive element is a step opening, the vertical ghost image problem may easily occur due to different viewing positions in the vertical direction.

Figure 13:
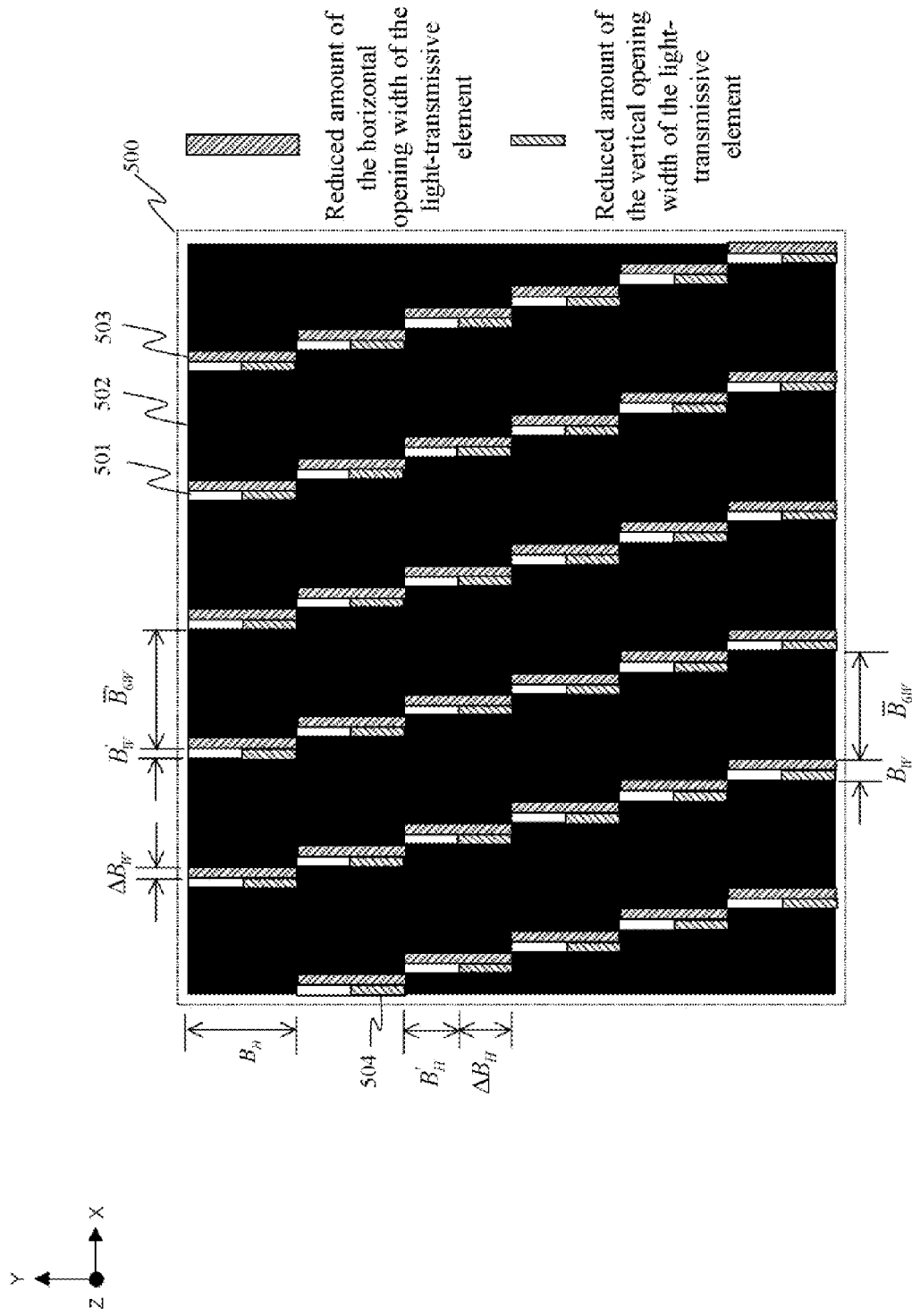
FIG. 13 is a schematic view of the multi-view slant-and-step parallax barrier structure after the horizontal and vertical opening widths of the light-transmissive element are optimized.

Regarding the multi-view slant-and-step parallax barrier 500 in FIG. 13, a proper reduction 504 must be made to a vertical opening width $B_H$ of the light-transmissive element of the parallax barrier to achieve the effect of increasing a vertical viewing range. The vertical viewing range refers to an allowed maximum vertical viewing range for viewing 3D images on the optimal viewing distance without generating any ghost image in the vertical direction. Therefore, the vertical opening width of the light-transmissive element is optimized according to the following formula:

$$B_H' = B_H - \Delta B_H \quad (30)$$

Figure 14:
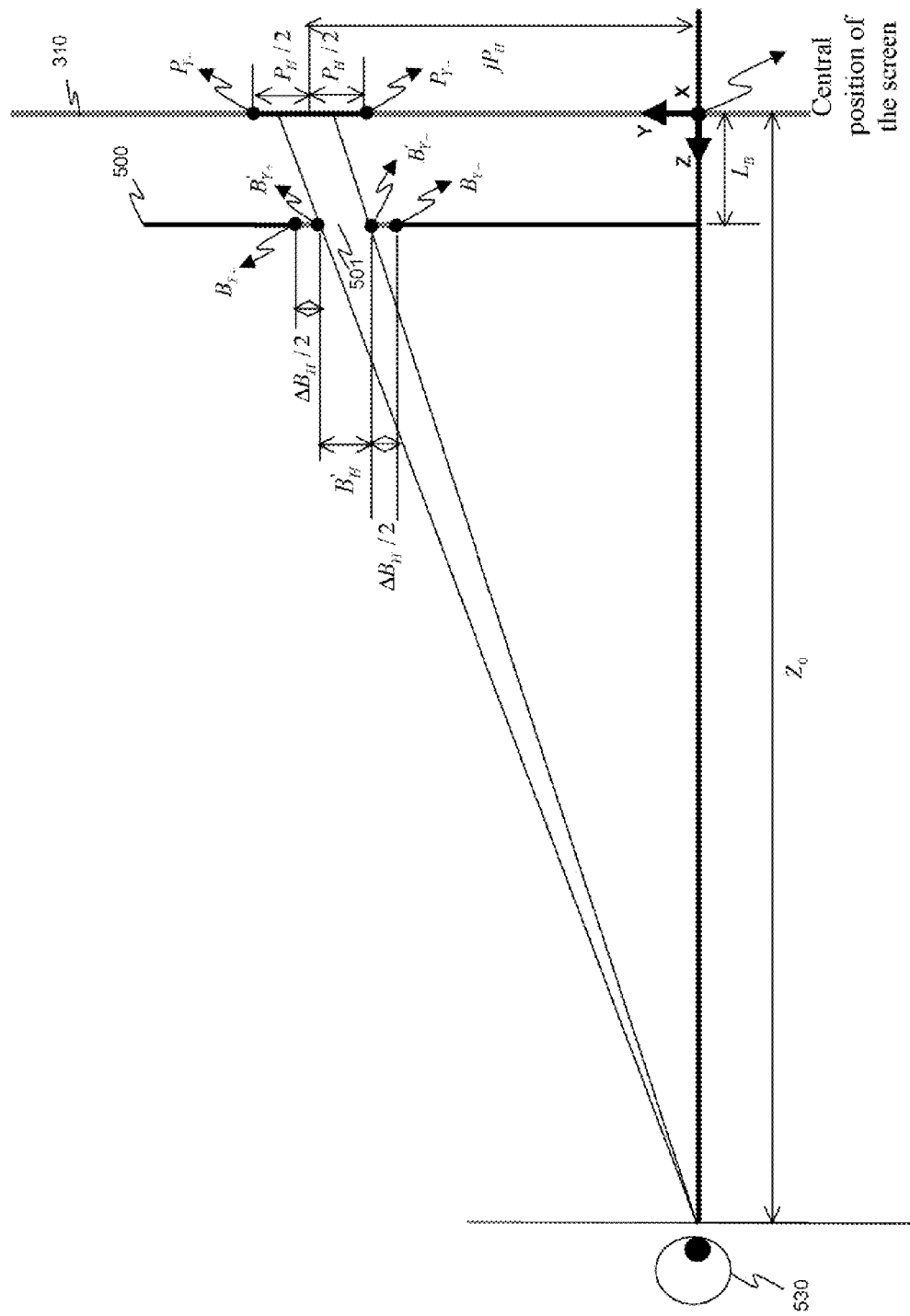
FIG. 14 is a schematic view of definitions of all relevant structures and parameters after the vertical opening width of the light-transmissive element is optimized.

FIG. 14 is a schematic view of definitions of all relevant structures and parameters after the vertical opening width of the light-transmissive element is optimized. Here, according to the optimization of the vertical opening width, the openings of the upper and lower ends of the light-transmissive element 501 are reduced by a proper amount $\Delta B_H/2$, so that after the optimization, the positions of the upper and lower ends of the light-transmissive element 501 are respectively $B'_{Y+}$, $B'_{Y-}$ and have the following relations:

$$B'_{Y+} = \frac{Z_0 - L_B}{Z_0} (j + 1/2) P_H - \frac{1}{2} \Delta B_H \quad (31)$$

$$B'_{Y-} = \frac{Z_0 - L_B}{Z_0} (j - 1/2) P_H + \frac{1}{2} \Delta B_H \quad (32)$$

Therefore, the eyes 530 of the viewer may view a part of the image of the sub-pixel 321 through the light-transmissive element 501. In addition, according to Formulas (31) and (32), Formula (30) may also be expressed as:

$$B'_H = B'_{Y+} - B'_{Y-} = \frac{Z_0 - L_B}{Z_0} P_H - \Delta B_H \qquad (33)$$

Figure 15:
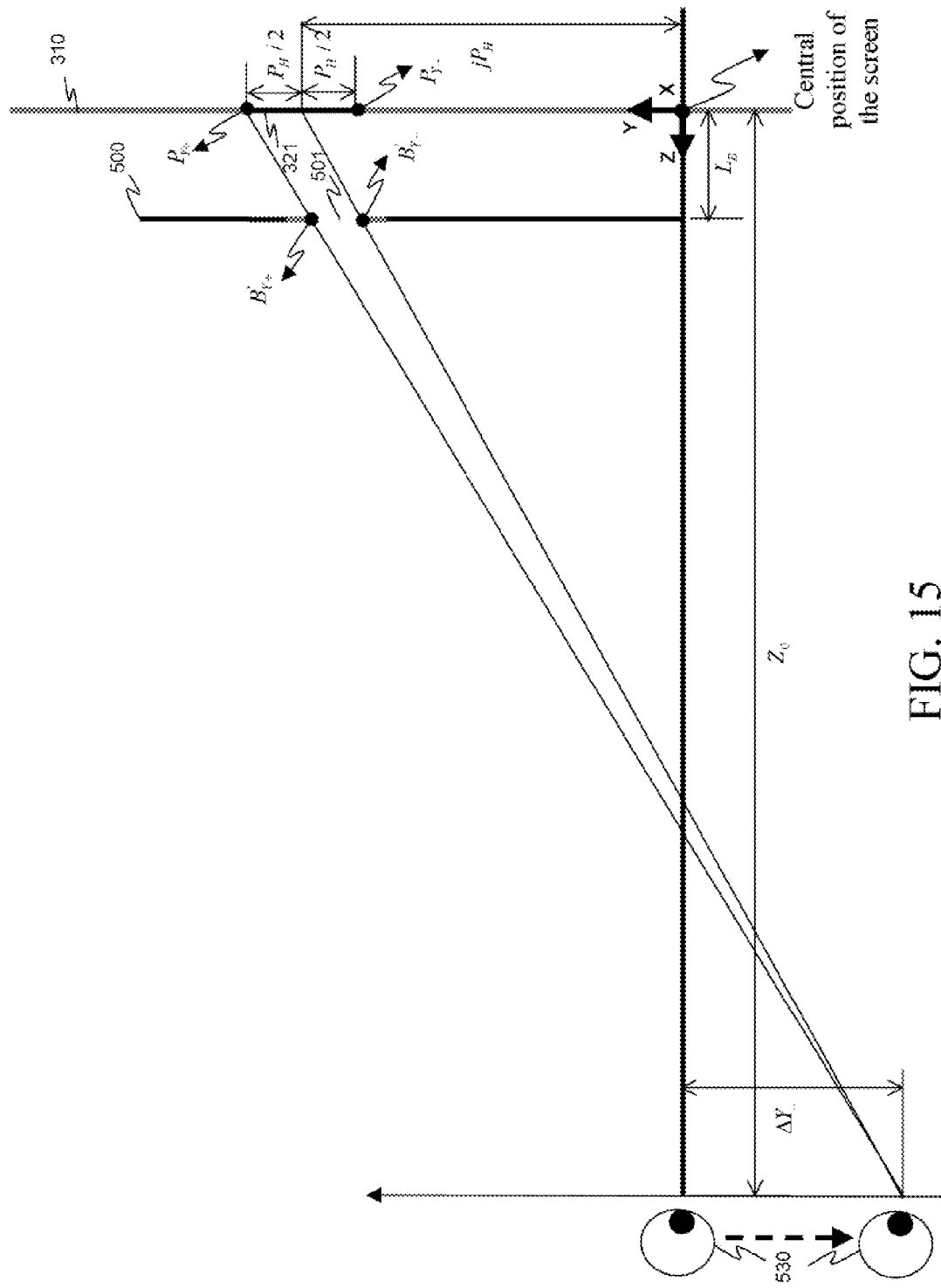
FIG. 15 is a schematic view of a lower vertical viewing range after the vertical opening width of the light-transmissive element is optimized.

FIG. 15 is a schematic view of a lower vertical viewing range after the vertical opening width of the light-transmissive element is optimized. The lower vertical viewing range $\Delta Y_-$ refers to an allowed maximum downward displacement of the viewer under the condition that the eyes 530 of the viewer can still view the image without any vertical ghost image when moving downwards from the central position. The relation of the lower vertical viewing range $\Delta Y_-$ and the reducing amount $\Delta B_H/2$ is expressed by the following formula:

$$\Delta Y_- = \frac{Z_0}{L_B} \frac{\Delta B_H}{2} \qquad (34)$$

Figure 16:
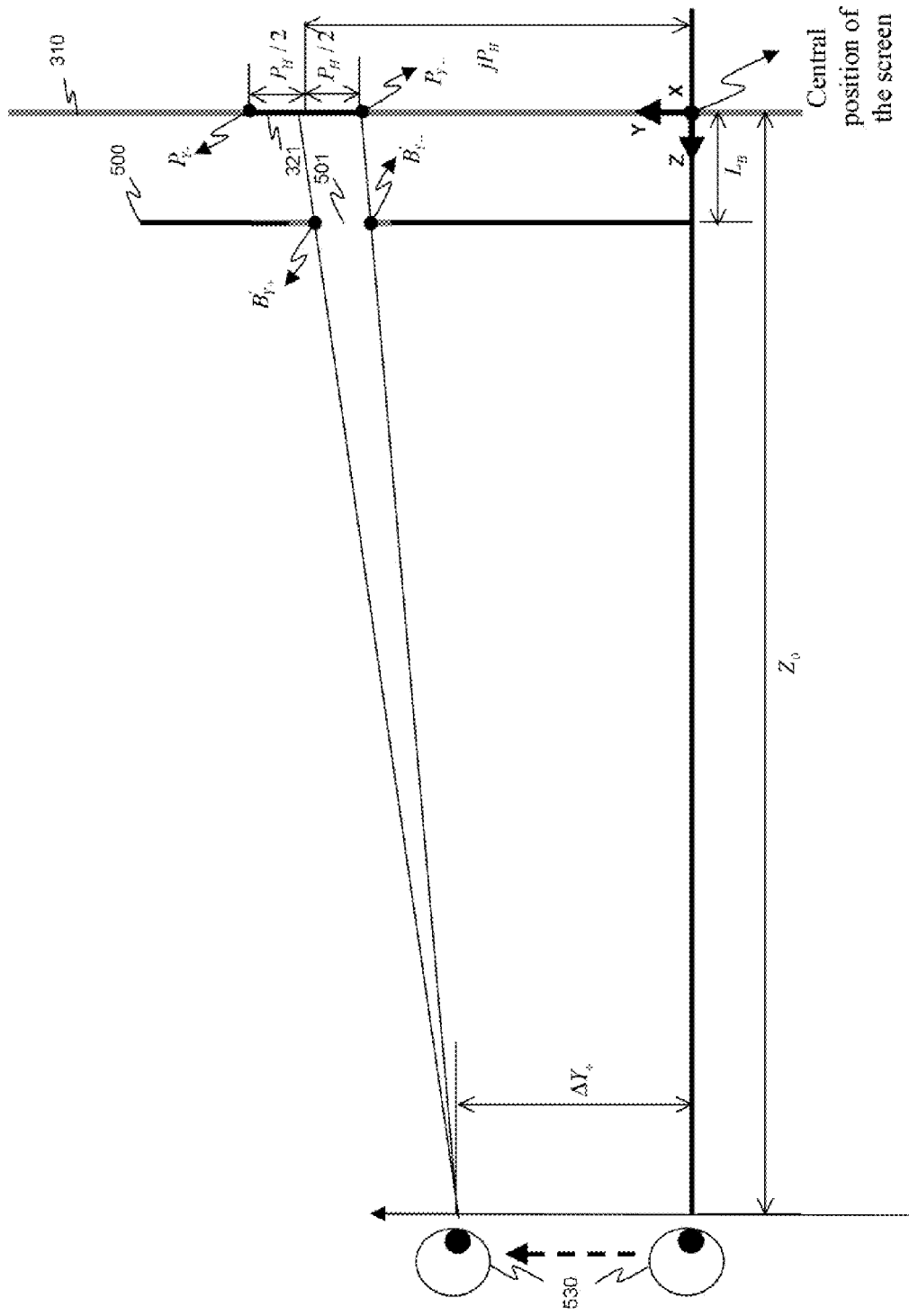
FIG. 16 is a schematic view of an upper vertical viewing range after the vertical opening width of the light-transmissive element is optimized.

FIG. 16 is a schematic view of an upper vertical viewing range after the vertical opening width of the light-transmissive element is optimized. The upper vertical viewing range $\Delta Y_+$ refers to an allowed maximum upward displacement of the viewer under the condition that the eyes 530 of the viewer can still view the image without any vertical ghost image when moving upwards from the central position. The relation of the upper vertical viewing range $\Delta Y_+$ and the reducing amount $\Delta B_H/2$ is expressed by the following formula:

$$\Delta Y_+ = \frac{Z_0}{L_B} \frac{\Delta B_H}{2} \qquad (35)$$

Therefore, according to Formulas (34) and (35), a vertical viewing range $\Delta Y$ is defined to be a sum of Formulas (34) and (35), and is expressed by the following formula:

$$\Delta Y = \frac{Z_0}{L_B} \Delta B_H \qquad (36)$$

Figure 17:
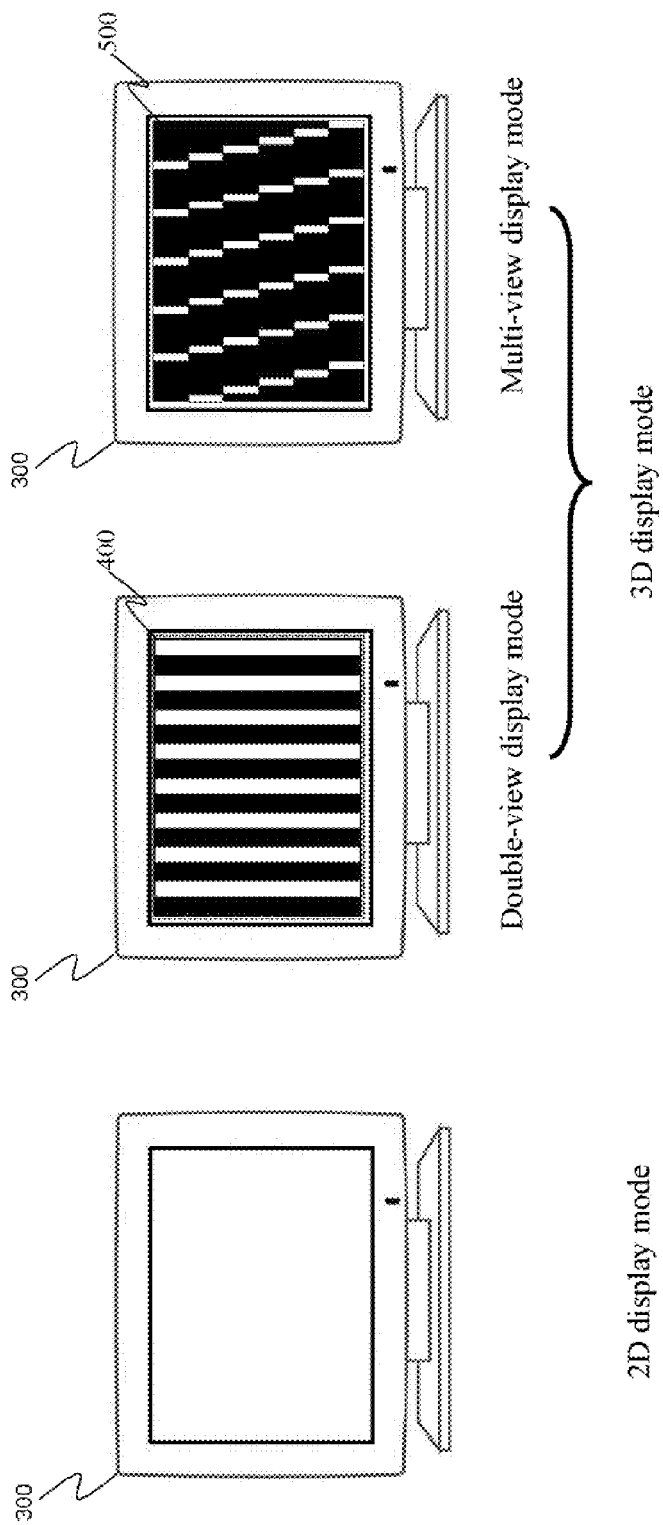
FIG. 17 is a schematic view of structure of a flat panel display installed with the multi-functional liquid crystal parallax barrier device.

In view of the above, regarding the double-view vertical strip parallax barrier 400 and the multi-view slant-and-step parallax barrier 500, after the opening of the light-transmissive element is subjected to optimization processes in the horizontal and vertical directions, the effect of increasing the horizontal viewing range and the vertical viewing range may be achieved. Therefore, the structures of the two parallax barriers 400, 500 are respectively disposed on two barrier electrode layers 108, 110 and 205, 209 in the multi-functional liquid crystal parallax barrier devices 100, 200. Finally, as shown in FIG. 17, the multi-functional liquid crystal parallax barrier devices 100, 200 are disposed on the flat panel display 300. Through the drive of a proper external voltage, the 2D display mode or the 3D display mode may be selected. The 3D display mode includes a double-view display mode and a multi-view display mode. Therefore, the viewer may properly switch the display mode of the multi-functional liquid crystal parallax barrier devices 100, 200 according to the 2D and 3D applications, and the display of the 2D or 3D image on the same optimal viewing distance is achieved.

What is claimed is:

1. A multi-functional liquid crystal parallax barrier device, being a liquid crystal device mainly formed by two parallax barrier structures, namely, a double-view vertical strip parallax barrier and a multi-view slant-and-step parallax barrier, wherein the two parallax barriers are disposed in the same horizontal display direction, so as to display a double-view 3D image and a multi-view 3D image, in addition to displaying a 2D image, through the control of an appropriate driving voltage, and a number of views of the multi-view image is greater than or equal to 2, and the liquid crystal structure device comprises an upper linear polarizer, an upper transparent substrate, an upper common electrode layer, an upper insulation layer, an upper barrier electrode layer, an upper alignment layer, a liquid crystal molecular layer, a lower alignment layer, a lower barrier electrode layer, a lower insulation layer, a lower common electrode layer, a lower transparent substrate, and a lower linear polarizer, wherein the electrode structures on the upper and lower barrier electrode layers are respectively installed with the double-view vertical strip parallax barrier or the multi-view slant-and-step parallax barrier, wherein regarding the structures of the double-view vertical strip parallax barrier and the multi-view slant-and-step parallax barrier, in the horizontal direction, the two parallax barriers respectively have a horizontal opening width $B_{nW}$ and $B_W$ of a light-transmissive element, a horizontal shielding width $\overline{B}_{nW}$ of a shielding element, an optimal viewing distance $Z_{n0}$, which are calculated by the following formulas:

$$B_{nW} = \frac{P_{nW} L_E}{P_{nW} + L_E}$$

$$\overline{B}_{nW} = (n-1) B_{nW}$$

$$Z_{n0} = \frac{P_{nW}}{P_{nW} - B_{nW}} L_B$$

wherein n is a number of views and $n \geq 2$, $P_{nW}$ is a horizontal width of a smallest view image display unit, $L_F$ is an average interpupillary distance (IPD), and $L_B$ is an installation distance of the parallax barrier, regarding the structure of the multi-view slant-and-step parallax barrier, in the vertical direction, the slant-and-step parallax barrier has a vertical opening width $B_H$ of the light-transmissive element, which is calculated by the following formula $$B_H = \frac{B_W}{P_W} P_H$$

where $P_H$ is a vertical width of a single RGB sub-pixel unit and $P_W$ is a horizontal width of the single RGB sub-pixel unit on a flat panel display screen.

2. The multi-functional liquid crystal parallax barrier device according to claim 1, wherein the multi-functional liquid crystal parallax barrier device is installed on a flat panel display screen, the flat panel display screen is formed by a plurality of RGB sub-pixel units, each RGB sub-pixel unit has a size of $P_W \times P_H$, where $P_W$ is a horizontal width of the sub-pixel and $P_H$ is a vertical width of the sub-pixel, and the RGB sub-pixel is configured in a horizontal direction or a vertical direction.

3. The multi-functional liquid crystal parallax barrier device according to claim 1, wherein for the double-view vertical strip parallax barrier and the multi-view slant-and-step parallax barrier, the horizontal widths $P_nW$ of the smallest view image display units respectively corresponded to the two parallax barriers are set to have the same value, so that the horizontal opening widths $B_nW$ of the two light-transmissive elements have the same value (set $B_{nW}=B_W$), and thus the two parallax barriers have the same optimal viewing distance.

4. The multi-functional liquid crystal parallax barrier device according to claim 3, wherein the horizontal width $P_{nW}$ of the smallest view image display unit is the horizontal width $P_W$ of a single RGB sub-pixel unit on the flat panel display screen, and the horizontal opening widths $B_W$ of the two light-transmissive elements have a relation of $$B_W = \frac{P_W L_E}{P_W + L_E}.$$

5. The multi-functional liquid crystal parallax barrier device according to claim 1, wherein for the structures of the double-view vertical strip parallax barrier and the multi-view slant-and-step parallax barrier, the horizontal opening widths of the light-transmissive elements of the two parallax barriers are properly reduced to increase a horizontal viewing range.

6. The multi-functional liquid crystal parallax barrier device according to claim 1, wherein for the structure of the multi-view slant-and-step parallax barrier, a vertical opening width of the light-transmissive element of the parallax barrier is properly reduced to increase a vertical viewing range.

\* \* \* \* \*